US011166130B1

(12) United States Patent
Manchanda et al.

(10) Patent No.: US 11,166,130 B1
(45) Date of Patent: Nov. 2, 2021

(54) DE-CONFIGURING OF DUAL-CONNECTIVITY SERVICE IN RESPONSE TO INITIATION OF VOICE CALL (71) Applicant: Sprint Spectrum L.P., Overland Park, KS (US)

(72) Inventors: Nitesh Manchanda, Overland Park, KS (US); Rashmi Kumar, Herndon, VA (US); Sreekar Marupaduga, Overland Park, KS (US); Vanil Parihar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 127 days.

(21) Appl. No.: 16/514,616

(22) Filed: Jul. 17, 2019

(51) Int. Cl.
*H04W 56/00* (2009.01)
*H04W 4/16* (2009.01)
*H04W 28/06* (2009.01)
*H04W 76/30* (2018.01)
*H04W 76/15* (2018.01)

(52) U.S. Cl.
CPC .............. *H04W 4/16* (2013.01); *H04W 28/06* (2013.01); *H04W 76/15* (2018.02); *H04W 76/30* (2018.02)

(58) Field of Classification Search
CPC ........ H04W 4/16; H04W 76/15; H04W 76/30; H04W 28/06
USPC ........................................................ 370/329
See application file for complete search history.

(56) References Cited

U.S. PATENT DOCUMENTS

| | | | |
|---|---|---|---|
| 10,834,637 B1* | 11/2020 | Pawar | H04W 28/08 |
| 2020/0008069 A1* | 1/2020 | Zhu | H04W 68/005 |
| 2020/0128454 A1* | 4/2020 | Teyeb | H04W 36/0069 |
| 2020/0389828 A1* | 12/2020 | Venkataraman | H04W 74/0833 |

* cited by examiner

*Primary Examiner* — Sai Ming Chan (57) ABSTRACT

A method and system for controlling connectivity of a user equipment device (UE). When a UE is served with dual connectivity by a first access node over a first connection in accordance with a first radio access technology (RAT) and a second access node over a second connection in accordance with a second RAT, initiation of a voice call for the UE will be detected. And in response to at least detecting the initiation of the voice call for the UE, the first access node will invoke transition of the UE from being served with the dual connectivity over the first connection and the second connection to instead being served with standalone connectivity over the first connection.

22 Claims, 4 Drawing Sheets

DE-CONFIGURING OF DUAL-CONNECTIVITY SERVICE IN RESPONSE TO INITIATION OF VOICE CALL

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has embraced various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels including time-frequency resources for carrying information between the access nodes and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to define a reference signal that UEs could measure in order to determine coverage strength, other resources could be reserved to carry downlink control-plane signaling from the access node to UEs, and other resources could be reserved to carry user-plane communications from the access node to UEs. And on the uplink, certain resources could be reserved to carry uplink control-plane signaling from UEs to the access node, and other resources could be reserved to carry user-plane communications from UEs to the access node.

OVERVIEW

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling with a core-network controller to attach and thus register for service, and the core-network controller could coordinate setup for the UE of one or more user-plane bearers, including for each bearer an access-bearer portion that extends between the access node and a core-network gateway that provides connectivity with a transport network and a data-radio-bearer (DRB) portion that extends over the air between the access node and the UE.

In practice, each such bearer could have a respective quality-of-service (QoS) class indicator (QCI) that associates the bearer with a particular QoS class indicating the type of communication that would be carried by the bearer. One bearer that could be set up initially for the UE would be a best-efforts bearer, perhaps a QCI 9 bearer, for carrying general packet-data communications. Further, if the UE subscribes to voice-over-packet (VOP) calling service, another bearer that could be set up initially for the UE would be a VOP signaling bearer, perhaps a QCI 5 bearer, for carrying Session Initiation Protocol (SIP) or other such signaling that would be used to set up or tear down VOP calls.

Once the UE is connected and attached, with one or more such bearers established, the access node could then serve the UE with packet-data communications.

For instance, when the core-network gateway receives packet-data for transmission to the UE, the data could flow to the access node, and the access node could buffer the data, pending transmission of the data to the UE. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs.

Likewise, on the uplink, when the UE has packet-data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry at least some of the data from the UE and could transmit to the UE a scheduling directive indicating those upcoming PRBs, and the UE could accordingly transmit the data to the access node in those PRBs.

Further, when the UE is so served by an access node, the UE could also regularly monitor the strength of its coverage to help ensure that the UE is served with sufficient and/or the strongest available coverage. For instance, the UE could regularly measure reference-signal strength from the access node and, when the reference signal strength becomes threshold low could transmit a measurement report to the access node. And in response, the access node could then direct the UE to scan for coverage of other access nodes, and if the UE finds sufficiently strong coverage of another access node, the UE could transmit a measurement report to the serving access node, and the serving access node could coordinate handover of the UE to the other access node.

In addition, while a UE is so served by an access node, if the UE is voice capable, a voice call could be initiated for the UE and could be carried over the UE's connection with the access node. For example, whether the call is placed by the UE or placed to the UE by another party, the UE might engage in VOP call-setup signaling with an Internet Multimedia Subsystem (IMS) to which the core network provides connectivity, and the core-network controller could in turn coordinate setup for the UE of a VOP bearer, perhaps a QCI 1 bearer (associated with voice service) through which packetized voice traffic of the call would then flow to and from the UE. Like other bearers as discussed above, this VOP bearer could include an access-bearer portion and a DRB portion. The UE could then engage in the VOP call accordingly.

As the industry advances from one generation of RAT to the next, issues arise with the need for UEs to support potentially multiple RATs at once. With the transition from 4G LTE to 5G NR, for instance, networks and UEs may be configured to support use of both technologies concurrently, with an arrangement referred to as EUTRA-NR Dual Connectivity (EN-DC). With such an arrangement, a UE might include a 4G radio and a 5G radio, and the 4G radio could be served by a 4G access node (evolved Node-B (eNB)) concurrently with the 5G radio being served by a 5G access node (next generation Node-B (gNB)). This arrangement could help support transition from 4G technology to 5G technology and could also facilitate higher peak data rate of communication by allowing data to be multiplexed over 4G and 5G connections, among possibly other benefits.

More generally, dual connectivity could encompass connectivity on two or more RATs concurrently, to facilitate technology transitions or for other purposes. Dual connectivity can thus be distinguished from standalone connectivity, where a UE is served on just one RAT, such as just LTE for instance.

In some dual-connectivity arrangements, a first access node operating under a first RAT could serve as a master node (MN), responsible for coordinating setup and teardown of dual-connectivity service for a UE, handling core-network control-plane signaling related to the dual-connectivity service, and controlling handover of the UE when appropriate, and a second access node operating under a second RAT could serve as a secondary node (SN) to provide increased data capacity for the UE. For example, with EN-DC, a 4G eNB could operate as the MN, and a 5G gNB could operate as the SN.

When the UE enters into coverage of such a system, the UE could initially scan for and discover threshold strong coverage of the MN under a first RAT (e.g., 4G coverage, for EN-DC), and the UE could responsively engage in signaling as discussed above to establish an RRC connection between the UE and the MN. Further, the UE could engage in attach signaling with a core-network controller via the MN, and the core-network controller could coordinate establishment for the UE of at least one bearer as discussed above.

The MN could then serve the UE in a first-RAT standalone mode (i.e., under just the first RAT) with packet-data communications in the manner described above.

Further, the MN could trigger and/or engage in a process to establish for the UE a secondary RRC connection with an SN, so that the MN and SN can then cooperatively provide the UE with dual-connectivity service. For instance, the MN could direct the UE to scan for secondary coverage under the second RAT and could receive in response from the UE a report that the UE detected threshold strong coverage of one or more SNs. And the MN could then coordinate setup of dual-connectivity service with the UE being served by the MN and such an SN.

While the specifics of setting up dual connectivity may vary from implementation to implementation, in an example, the MN could engage in signaling with the SN, with the UE, and with the core-network controller, to coordinate setup of the dual-connectivity service. For instance, the MN could engage in signaling with the UE and with the SN to arrange for setup of a secondary connection between the UE and the SN. And the MN could engage in signaling with the core-network controller and/or with the SN to establish for the UE a split-bearer arrangement so that the MN could serve a portion of the UE's data communications and the SN could serve another portion of the UE's data communications.

In an example network, dual connectivity would be used for just non-voice service, and on the other hand, voice service would be provided through standalone first-RAT connectivity. With EN-DC for instance, VOP call service may be provided over just 4G LTE, while a combination of 4G LTE and 5G NR would be used for non-voice packet-data communication. Thus, while an MN may coordinate setup of dual-connectivity service for a UE, a voice call that is initiated for the UE would then be handled over just the UE's connection with the MN rather than being split over the UE's master connection and the UE's secondary connection.

In terms of bearers, this may mean that a QCI 9 (best efforts) bearer that was initially set up for the UE when the UE had standalone first-RAT connectivity may be split to be via both the UE's master connection and the UE's secondary connection, but a QCI 1 bearer that is set up for carrying a VOP call with UE (and perhaps an associated QCI 5 for carrying VOP control signaling) would be anchored only at the MN and via the UE's master connection and would not be split to be via both the UE's master connection and the UE's secondary connection.

With this situation, technical inefficiency can arise when a UE that is served with dual connectivity is engaged in a voice call. Often (though not always) when a UE is engaged in a voice call, the UE would not simultaneously engage in non-voice packet-data communication (i.e., packet-data communication other than the voice call and associated voice-call signaling). Therefore, during a VOP call that is provided over just the UE's master connection, maintaining the UE's secondary connection could unnecessarily consume resources. For example, maintaining the UE's secondary connection in that scenario could involve the UE regularly monitoring coverage strength from the UE's serving SN, which could unnecessarily consume the UE's battery energy. Further, especially in a network where coverage under the second RAT is spotty, the UE may more often need to monitor and report second-RAT coverage strength for possible handover, which could further consume the UE's battery energy and might result in other issues.

Disclosed herein is a method and system to help address this issue. In accordance with the disclosure, when a UE is served with dual connectivity by a first access node over a first connection in accordance with a first RAT and a second access node over a second connection in accordance with a second RAT, initiation of a voice call for the UE (e.g., to or from the UE) will be detected. And in response to at least detecting the initiation of the voice call for the UE in that scenario, the first access node will invoke transition of the UE from being served with the dual connectivity over the first connection and the second connection to instead being served with standalone connectivity over the first connection. For instance, the first access node could respond to at least initiation of the voice call for the UE by engaging in signaling that causes release of the UE's second connection and de-configuration of a split-bearer arrangement that is in place for the UE.

Transitioning the UE to standalone connectivity in response to at least detecting the initiation of the voice call for the UE may help avoid or minimize unnecessary use of resources associated with the UE's second-RAT connection.

Further in accordance with the disclosure, the first access node could then detect when the voice call is complete (e.g., has ended) and could then responsively transition the UE back from the standalone connectivity to dual connectivity.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system that supports EN-DC service and standalone-4G service. However, it should be understood that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it should be understood that operations described as being performed by one or more entities could be implemented in various ways, such as by a processor executing instructions stored in non-transitory data storage, along with associated circuitry or other hardware, among other possibilities.

Figure 1:
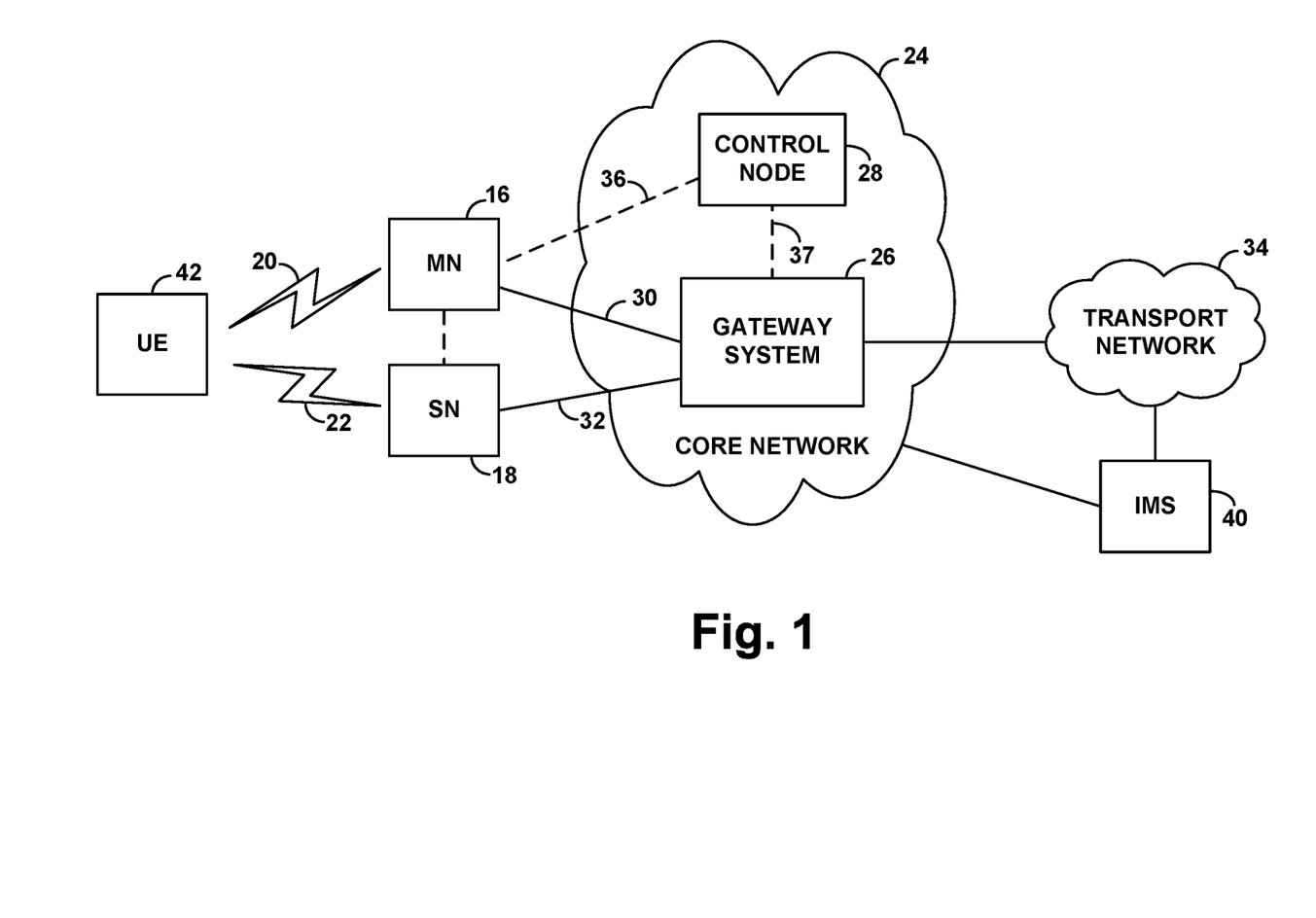
FIG. 1 is a simplified block diagram of an example network arrangement in which aspects of the present disclosure can be implemented.

FIG. 1 is a simplified block diagram of an example network arrangement that supports providing wireless-packet-data service according to 4G LTE and 5G NR protocols, providing EN-DC service, and providing VOP service.

The example network is shown including a representative MN 16, likely an LTE eNB, and a representative SN 18, likely a 5G NR gNB. The MN 16 and SN 18 could be co-located at a common cell site, sharing an antenna tower or other antenna structure, and sharing baseband hardware or the like, but being separately defined to provide discrete 4G and 5G connections and service. Further, the MN and SN could each be configured to provide respective coverage 20, 22 on one or more carriers, defining respective frequency bandwidth and air-interface resources for carrying communications wirelessly to/from served UEs.

In an example implementation, the respective coverage on each carrier of coverage 20 and coverage 22 could be divided over time into frames, subframes, timeslots, and symbol segments, and could be divided over frequency bandwidth into subcarriers. As a result, the respective coverage could define an array of time-frequency resource elements, in which subcarriers can be modulated to carry data communications.

In each subframe, these resource elements could be divided into groups defining the PRBs noted above, which could be allocable by the associated access node (MN or SN) on an as-needed basis to carry data communications as noted above. And certain resource elements per subframe could be reserved for other purposes, such as to carry a reference signal, synchronization signals, scheduling directives, acknowledgement messages, and other control signaling.

The 4G air interface and 4G service provided by MN 16 could differ from the 5G air interface and 5G service provided by 5G SN 18 in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

As further shown in the example of FIG. 1, the MN and SN are each connected with a core network 24, which includes a gateway system 26 and a control node 28. In an example core network, the gateway system 26 could include a serving gateway (SGW) and a packet-data network gateway (PGW) (neither shown), with the SGW having a communication interface 30 with the MN and a communication interface 32 with the SN, and with the PGW providing connectivity with a transport network 34 such as the Internet or a private network. And the control node 28 could be a mobility management entity (MME), which could have a communication interface 36 with the MN and a communication interface 37 with the gateway system 26 (e.g., with the SGW).

Also shown accessible on or via core network 24 or transport network 34 is an IMS 40. The IMS could support VOP service for served UEs. For instance, the IMS could support SIP signaling with served UEs to set up and manage VOP calls, and the IMS could include a media server (not shown) to bridge and connect such calls to remote call parties or the like. Thus, a served UE might engage in SIP signaling with the IMS to set up an incoming or outgoing VOP call, establishing a packet-based real-time media session (e.g., Real-time Transport Protocol (RTP) session) between the UE and IMS, which the IMS might bridge with a remote party, to facilitate voice-call communication between the UE and the remote party.

In line with the discussion above, when a UE 42 initially enters into coverage of this network, the UE could discover coverage of the MN, such as by scanning predefined 4G carriers to find a synchronization signal from the MN and then determining that a reference signal from the MN is strong enough to justify connecting. The UE could then engage in random-access signaling and RRC signaling with the MN to establish an RRC connection with the MN, defining a master connection between the UE and the MN. And the UE could then engage in attach signaling with the control node 28, via the master connection and MN, to register for service with the network, triggering the control node 28 to coordinate setup for the UE of both a best-efforts bearer (e.g., QCI 9 bearer) and a VOP signaling bearer (e.g., QCI 5 bearer).

Further in line with the discussion above, the MN could additionally work to set up EN-DC service for the UE. For instance, the MN could send to the UE an RRC message that directs the UE to scan for and report any threshold strong coverage that the UE detects on 5G carriers. And upon receipt of such a report from the UE specifying that the UE detected threshold strong coverage of coverage of SN 18, the MN could then engage in signaling with that SN and with the UE to coordinate setup of the secondary connection between the SN and the UE. Further, the MN could engage in signaling with the control node 28 and/or the SN 18 to coordinate splitting of the UE's best-efforts bearer so as to enable the MN and SN to concurrently serve the UE over their respective connections with the UE.

Various split-bearer arrangements may be possible.

In one implementation, the split bearer could be established at the gateway system 30, with one bearer leg extending between the gateway system and the MN and another bearer leg extending between the gateway system and the SN. For instance, while maintaining the UE's access bearer between the MN and the gateway system, the control node 28 could coordinate setup of a secondary access bearer between the SN and the gateway system. With this arrangement, communications between the UE and the MN could flow over the access bearer between the MN and the gateway system, and communications between the UE and the SN could flow over the access bearer between the SN and the gateway system.

In another implementation, the split bearer could be established at the SN, with the UE's access bearer extending between the gateway system and the SN and a leg of the access bearer extending further between the SN and the MN. For instance, the control node 28 could coordinate transfer of the UE's access bearer from being between the gateway system and the MN to instead being between the gateway system and the SN, and the MN and SN could coordinate setup of the bearer leg between the MN and the SN. With this arrangement, communications between the SN and the UE would flow over the access bearer between the SN and the gateway system, and communications between the MN and the UE would flow between the MN and the SN and likewise over the access bearer between the SN and the gateway system.

And in yet another implementation, the split bearer could be established at the MN, with the UE's access bearer still extending between the gateway system and the MN, and with a leg of the bearer extending between the MN and the SN. For instance, the MN could maintain the access bearer between the MN and the gateway system, and the MN and SN could coordinate setup of the bearer leg between the MN and the SN. With this arrangement, communications between the MN and the UE could flow over the access bearer between the MN and the gateway system, and communications between the SN and the UE could flow between the SN and the MN and likewise over the access bearer between the MN and the gateway system.

Other split-bearer arrangements might be possible as well.

With dual-connectivity service so established through this and/or other steps, the MN and SN could then concurrently serve the UE over their respective connections with the UE, perhaps with both providing for both downlink and uplink scheduled data communication, or perhaps with both providing for downlink scheduled data communication but just one of them providing for uplink scheduled data communication.

On the downlink, for instance, some of the data destined to the UE could be buffered by the MN for transmission to the UE, and the MN could coordinate downlink transmission of data over the air from the MN to the UE as discussed above. And other of the data destined to the UE could be buffered by the SN for transmission to the UE, and the SN could coordinate downlink transmission of that data over the air from the SN to the UE as discussed above.

Likewise, when the UE has data to transmit, the UE could buffer some of that data for transmission to the MN as discussed above and the UE could buffer other of that data for transmission to the SN as discussed above. Thus, the UE could send to the MN a BSR indicating how much data the UE has buffered for transmission to the MN, and the MN could coordinate uplink transmission of that data over the air from the UE to the MN. And the UE could send to the SN a BSR indicating how much data the UE has buffered for transmission to the SN, and the SN could coordinate uplink transmission of that data over the air from the UE to the SN. Alternatively, the UE could limit its uplink transmission to just the SN.

As noted above, in this network that supports providing both 4G LTE service and 5G NR service, VOP service may be limited to being provided over just 4G LTE. Thus, in the arrangement of FIG. 1, while the UE may make use of its EN-DC connections with the MN and SN to engage in high-data-rate packet-data communications generally, the UE may use just its master connection with the MN, and not its secondary connection with the SN, to engage in VOP service. Accordingly, when the EN-DC service is being configured for the UE, the UE's best-efforts bearer served by the LTE MN might be split to allow the MN and SN to cooperatively provide the UE with EN-DC service, whereas the UE's VOP-signaling bearer may remain anchored at the MN rather than being split with the SN.

In such an arrangement, to facilitate VOP call service once the UE has connected with the MN, the UE could engage in SIP signaling with the IMS via the UE's master connection and the UE's VOP signaling bearer to register with the IMS, so that the IMS will know where to reach the UE for calls placed to the UE. When the UE has a voice call to place or the IMS has a voice call to connect to the UE, the UE could then engage in SIP signaling with the IMS via the UE's master connection and the UE's VOP signaling bearer, to set up a VOP call session with the IMS. Further, the IMS could responsively engage in signaling with the core network to cause the core network to set up for the UE a dedicated VOP bearer, perhaps a QCI 1 bearer, with associated signaling passing to the MN to cause the MN to extend the bearer to the UE as a DRB over the UE's master connection. The UE could then engage in the VOP over this dedicated VOP bearer and through the UE's packet-based voice session with the IMS.

As noted above, the present disclosure provides that when a voice call is initiated for a UE that has dual connectivity with the MN and SN, the MN will responsively invoke transition of the UE from being served with the dual connectivity to instead being served with standalone connectivity over the UE's connection with the MN.

With the example arrangement discussed above, the MN could conveniently carry out this method, as the MN would be involved with setup of the VOP call for the UE and would therefore have knowledge of when a VOP call is initiated for the UE, and as the MN is the entity that controls the dual-connectivity process including setup and release of secondary connectivity for the UE. In alternative implementations, however, one or more other entities could carry out the method and/or could cause one or more steps of the process to be carried out.

Figure 2:
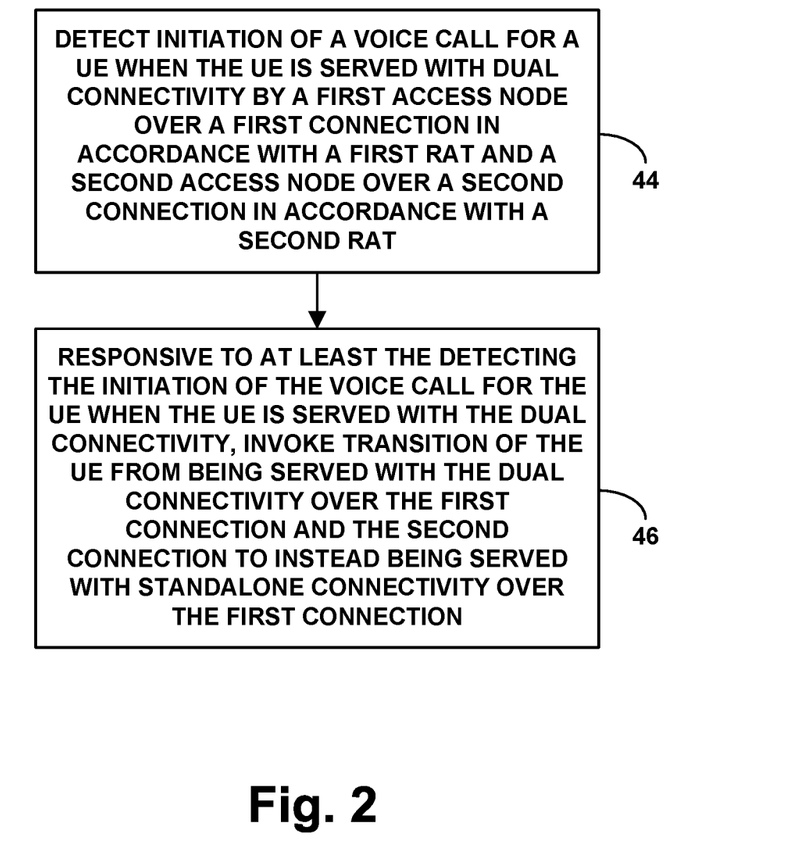
FIG. 2 is a flow chart depicting an example method in accordance with the disclosure.

FIG. 2 is a flow chart depicting a method that can be carried out in accordance with this disclosure, to control connectivity of a UE.

As shown in FIG. 2, at block 44, the method involves detecting initiation of a voice call for the UE when the UE is served with dual connectivity by (i) a first access node over a first connection in accordance with a first RAT and (ii) a second access node over a second connection in accordance with a second RAT. And at block 46, the method involves responsive to at least the detecting the initiation of the voice call for the UE when the UE is served with the dual connectivity, invoking transition of the UE from being served with the dual connectivity over the first connection and the second connection to instead being served with standalone connectivity over the first connection.

In line with the discussion above, the first RAT could be 4G LTE and the second RAT could be 5G NR. Further, the voice call could be a VOP call, and it could be that the voice call will be carried over the first connection but not over the second connection.

Further, the act of detecting initiation of the voice call could itself take various forms, perhaps involving detecting setup for the UE of a bearer having a QCI that corresponds with voice-call service and/or involving detecting other signaling related to setup of the voice call.

For example, if the UE engages in SIP signaling or the like via the first access node (e.g., via a QCI 5 bearer) to set up the voice call, the first access node might detect that signaling through deep-packet inspection or another mechanism and may thereby determine that the UE is engaging in signaling to set up the voice call. And more specifically, the first access node might detect such signaling indicating successful setup of the voice call. Alternatively, another entity within the signaling path might detect such signaling and perhaps report to the first access node that setup of the voice call is occurring.

As another example, if the UE engages in signaling with the IMS to set up a voice call and the IMS signals to the core network to cause the core network to initiate setup for the UE of a QCI 1 bearer for the call, a QCI-1 bearer-setup request might pass from the control node 28 to the first access node to direct setup of the QCI 1 bearer, which the first access node could deem to be an indication of voice-call for the UE because a bearer having a QCI of 1 is a bearer that corresponds with voice-call service. Other examples are possible as well.

Further, the act of invoking transition of the UE from being served with dual connectivity over the first connection and over the second connection to being served instead with standalone first-RAT connectivity over the first connection comprises the first access node engaging in signaling with the UE and the second access node, to release the second connection. By way of example, the first access node could engage in signaling with the second access node over an inter-access-node interface (e.g., X2 interface) to notify, direct, and/or otherwise cause the second access node to clear or otherwise release its second-RAT connection with the UE, and the first access node could transmit an RRC connection-reconfiguration message to the UE to notify, direct, and/or otherwise cause the UE as to the release of the second connection.

In a representative implementation, this release of the second connection could be conditioned on a determination that there is less than a threshold quantity of data buffered for communication with the UE.

By way of example, at issue here could be whether there is less than a predefined threshold quantity of data buffered for transmission on the second connection to or from the UE. In practice, the second access node might learn of this information based on BSRs that it receives from the UE for uplink transmission and/or based on its own buffering of data for downlink transmission to the UE and could report to the first access node the quantity of buffered data autonomously or in response to a request from the first access node. The first access node could then compare the reported quantity of buffered data as to uplink and/or downlink transmission to the predefined threshold so as to make the determination.

Here, the threshold analysis could be a question of whether there is any data currently buffered for transmission over the second connection to and/or from the UE. Conditioning the release of the second connection on this factor could then involve proceeding with the release if and only if there is no data so buffered, and otherwise not proceeding with the release. Alternatively, the threshold analysis could be question of whether there is less than some non-zero quantity of data currently buffered for transmission over the second connection to and/or from the UE, in which case conditioning the release of the second connection on this factor could involve proceeding with the release if and only if there is less than that non-zero quantity of data so buffered. Further, the "less than" analysis could just as well mean less than or equal to.

In addition or alternatively, the release of the second connection could be conditioned on a determination that the UE is not actively engaged in data communication on the second connection. For instance, this could involve determining whether the UE has sent a scheduling request for uplink transmission and the transmission is occurring or has not yet occurred. Or this could involve the second access node having data buffered for transmission to the UE on the second connection similar to the analysis above.

The act of invoking transition of the UE from being served with dual connectivity over the first connection and over the second connection to being served instead with standalone first-RAT connectivity over the first connection could also involve the first access node engaging in signaling that causes de-configuration of a split bearer that is in place for the UE for the dual connectivity. This could depend on the form of split bearer, such as which of the above-discussed split-bearer arrangements are in place, and could involve the first access node signaling with the second access node to remove the split bearer and/or engaging in signaling with the control node 28 to remove the split bearer.

For example, in a scenario where the UE has a best-efforts bearer split at the second access node and thus where the access-bearer leg is between the gateway system and the second access node, the first access node might sent a bearer-modification request message to the control node 28 to cause the control node to engage in signaling to coordinate transition of that access-bearer leg from being between the gateway system and the second access node to instead being between the gateway system and the first access node.

In a representative implementation as discussed above, the first access node may be the entity that engaged in signaling in the first place to set up the dual connectivity with which the UE is served when the initiation of the voice call is detected. Thus, as noted above, the first access node could be well positioned to also engage in the signaling to transition the UE from having dual connectivity to having standalone first-RAT connectivity.

In addition, in a representative implementation, the method could further involve the first access node detecting completion of the voice call and, responsive to at least detecting the completion of the voice call, invoking transition of the UE from being served with the standalone connectivity to being served again with dual connectivity by the first access node and the second access node.

Here, for instance, the first access node could detect completion (ending) of the voice call through deep packet inspection of call setup/teardown signaling as discussed above. Alternatively, when the voice call ends, the IMS could signal to the core network, the control node could responsively send to the first access node a bearer-release message requesting release of the QCI 1 bearer that had been set up to carry the voice call, and the first access node could detect completion of the voice call by detecting receipt of that bearer-release message.

Further, invoking transition of the UE from being served with the standalone connectivity to being served again with dual connectivity by the first access node and the second access node could involve the first access node engaging in signaling with the UE and the second access node, to establish for the UE a new second connection with the second access node and could involve the first access node engaging in signaling to configure (e.g., trigger or coordinate setup of) a split bearer for the UE as discussed above.

Figure 3:
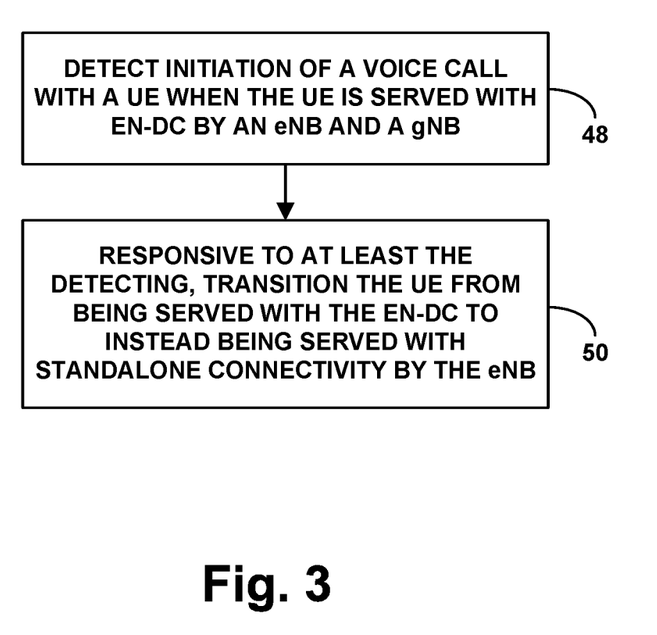
FIG. 3 is another flow chart depicting an example method in accordance with the disclosure.

FIG. 3 is another flow chart depicting a method that can be carried out in accordance with this disclosure, to control connectivity of a UE. This method as well could be carried out by the first access node and/or by one or more other entities.

As shown in FIG. 3, at block 48, the method includes detecting initiation of a voice call with the UE when the UE is served with EN-DC by an eNB and a gNB. And at block 50, the method involves, responsive to at least the detecting, transitioning the UE from being served with the EN-DC to instead being served with standalone connectivity by the eNB. Various features discussed above can be implemented in this context as well, and vice versa.

Figure 4:
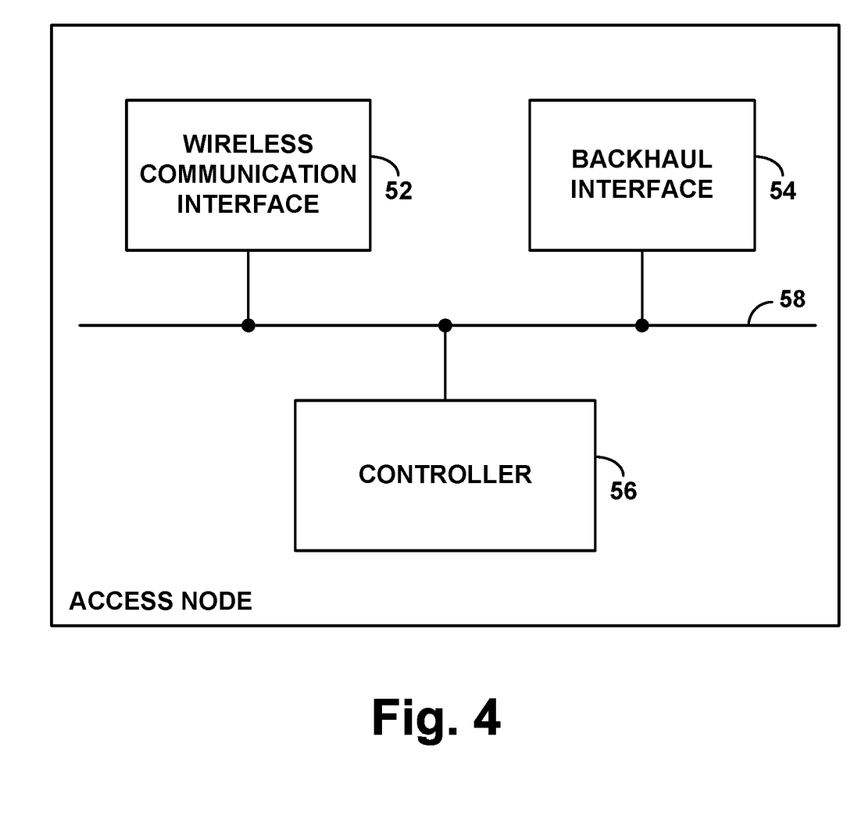
FIG. 4 is a simplified block diagram of an example first access node operable in accordance with the disclosure.

FIG. 4 is next a simplified block diagram of an example first access node operable in accordance with present disclosure. As shown, the example first access node includes a wireless communication interface 52, a backhaul interface 54, and a controller 56, all of which may be communicatively linked together by a system bus, network, or other connection mechanism 58 and/or could be integrated together or distributed in various ways.

In this example arrangement, the wireless communication interface 54 could be configured to provide cellular coverage and to engage in air interface communication with served UEs. As such, wireless communication interface 54 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of bearer and control data over the air interface in accordance with a RAT such as any of those noted above. Further, backhaul interface 54 could comprise a wired or wireless interface, such as an Ethernet network communication interface, configured to support communication with other entities, such as with various core network entities and other access nodes for instance.

Controller 56 could then comprise control logic to cause the first access node to carry out particular operations including those described herein. As such, the controller 56 could take various forms, including but not limited to a processing unit including one or more processors (e.g., one or more general purpose microprocessors and/or one or more dedicated processing units) and non-transitory data storage (e.g., one or more volatile and/or non-volatile storage components, such as magnetic, optical, or flash storage) holding program instructions executable by the processing unit to cause the first access node to carry out various operations described herein and thus to control operation of the first access node.

It should also be understood that the present disclosure also contemplates a non-transitory computer readable medium having encoded thereon program instructions executable to carry out such operations as well.

In an example implementation, for instance, the controller could be configured to detect initiation of a voice call for the UE when the UE is served with dual connectivity by the first access node over a first connection on a first RAT and a second access node over a second connection on a second RAT. And the controller could be configured to respond to at least the detecting by invoking transition of the UE from being served with the dual connectivity by the first access node and the second access node to being served instead with standalone-connectivity by the first access node.

Here too, various features discussed above can be implemented in this context as well, and vice versa.

Exemplary embodiments have been described above. Those skilled in the art will understand, however, that changes and modifications may be made to these embodiments without departing from the true scope and spirit of the invention.

We claim:

1. A method for controlling connectivity of a user equipment device (UE), the method comprising:
    detecting initiation of a voice call for the UE when the UE is served with dual connectivity by (i) a first access node over a first connection in accordance with a first radio access technology (RAT) and (ii) a second access node over a second connection in accordance with a second RAT; and
    responsive to at least the detecting the initiation of the voice call for the UE when the UE is served with the dual connectivity, invoking transition of the UE from being served with the dual connectivity over the first connection and the second connection to instead being served with standalone connectivity over the first connection.

2. The method of claim 1, wherein the voice call will be carried over the first connection.

3. The method of claim 2, wherein the voice call is a voice-over-packet call.

4. The method of claim 1, wherein detecting initiation of the voice call for the UE comprises detecting setup for the UE of a bearer having a quality of service class indicator that corresponds with voice-call service.

5. The method of claim 1, wherein invoking transition of the UE from being served with the dual connectivity over the first connection and over the second connection to being served instead with standalone first-RAT connectivity over the first connection comprises the first access node engaging in signaling with the UE and the second access node, to release the second connection.

6. The method of claim 5, further comprising conditioning the release of the second connection on a determination that there is less than a threshold quantity of data buffered for communication with the UE.

7. The method of claim 5, further comprising conditioning the release of the second connection on a determination that the UE is not actively engaged in data communication on the second connection.

8. The method of claim 1, invoking transition of the UE from being served with the dual connectivity over the first connection and over the second connection to being served instead with standalone first-RAT connectivity over the first connection comprises the first access node engaging in signaling that causes de-configuration of a split bearer for the UE.

9. The method of claim 1, further comprising engaging in signaling by the first access node to set up the dual connectivity with which the UE is served when the initiation of the voice call is detected.

10. The method of claim 1, further comprising:
detecting by the first access node completion of the voice call;
responsive to at least detecting completion of the voice call, invoking transition of the UE from being served with the standalone connectivity to being served again with dual connectivity by the first access node and the second access node.

11. The method of claim 10, wherein invoking transition of the UE from being served with the standalone connectivity to being served again with dual connectivity by the first access node and the second access node comprises the first access node engaging in signaling with the UE and the second access node, to establish for the UE a new second connection with the second access node.

12. The method of claim 10, wherein invoking transition of the UE from being served with the standalone connectivity to being served again with dual connectivity by the first access node and the second access node comprises the first access node engaging in signaling to configure a split bearer for the UE.

13. The method of claim 1, wherein the first RAT is 4G LTE and the second RAT is 5G NR.

14. A method for controlling connectivity of a user equipment device (UE), the method comprising:
detecting initiation of a voice call with the UE when the UE is served with EUTRA-NR Dual Connectivity (EN-DC) by an evolved-Node-B (eNB) and a gigabit-Node-B (gNB); and
responsive to at least the detecting, transitioning the UE from being served with the EN-DC to instead being served with standalone connectivity by the eNB.

15. A first access node configured to control connectivity of a user equipment device (UE), the first access node comprising:
a wireless communication interface configured to engage in wireless communication with the UE;
a backhaul network interface through to communicate with other entities; and
a controller configured to control operation of the first access node,
wherein the controller is configured to detect initiation of a voice call for the UE when the UE is served with dual connectivity by the first access node over a first connection on a first radio access technology (RAT) and a second access node over a second connection on a second RAT, and
wherein the controller is configured to respond to at least the detecting by invoking transition of the UE from being served with the dual connectivity by the first access node and the second access node to being served instead with standalone-connectivity by the first access node.

16. The first access node of claim 15, wherein the voice call is a voice-over-packet call and will be carried over the first connection.

17. The first access node of claim 15, wherein detecting initiation of the voice call for the UE comprises detecting setup for the UE of a bearer having a quality of service class indicator that corresponds with voice-call service.

18. The first access node of claim 15, wherein invoking transition of the UE from being served with the dual connectivity over the first connection and over the second connection to being served instead with standalone first-RAT connectivity over the first connection comprises causing the first access node to engage in signaling to release the second connection.

19. The first access node of claim 15, wherein invoking transition of the UE from being served with the dual connectivity over the first connection and over the second connection to being served instead with standalone first-RAT connectivity over the first connection comprises causing the first access node to engage in signaling to de-configure a split bearer for the UE.

20. The first access node of claim 15, wherein the controller is further configured to detect completion of the voice call and, in response to at least detecting completion of the voice call, to invoke transition of the UE from being served with the standalone connectivity to being served again with the dual connectivity by the first access node and the second access node.

21. The first access node of claim 20, wherein invoking transition of the UE from being served with the standalone connectivity to being served again with dual connectivity by the first access node and the second access node comprises causing the first access node to engage in signaling with the UE and the second access node, to establish for the UE a new second connection with the second access node.

22. The first access node of claim 20, wherein invoking transition of the UE from being served with the standalone connectivity to being served again with dual connectivity by the first access node and the second access node comprises causing the first access node to engage in signaling to configure a split bearer for the UE.

* * * * *